3,330,684
PRINTING INK COMPOSITION CONTAINING A COLORANT, A BINDER AND HIGH DENSITY POLYETHYLENE SPHERULITES, AND A POLYMERIC BASE IMPRINTED THEREWITH
John B. Wheeler III, Middlesex, N.J., assignor to Union Carbide Corporation, a corporation of New York
No Drawing. Filed Aug. 14, 1964, Ser. No. 389,787
10 Claims. (Cl. 117—38)

This invention relates to printing ink compositions. More specifically, this invention relates to quicksetting, high scratch and abrasion resistant printing ink compositions particularly suited for printing on polymeric materials.

Printing on polymeric materials such as polyethylene, polyvinyl chloride and polystyrene film, sheet and molded articles by a lithographic or letterpress printing process has been very difficult because the inks available for such printing are relatively slow setting and have poor scratch and abrasion resistance.

In a sheet-fed lithographic or letterpress printing process, commonly used inks are dried by oxidative polymerization of drying oils or drying oil modified resins such as alkyds and phenolics. Such inks, when used for printing on polyethylene sheet for example, do not dry fast enough to prevent the ink from sticking or offsetting onto the sheet above it when they are piled for drying after printing. Consequently, the printing process must be slowed down to allow for adequate drying. Thus the press operating rates for printing polymeric materials are much slower than for porous materials such as paper. Furthermore, the scratch and abrasion resistance of such inks printed on polymeric materials, especially polyethylene, is extremely poor.

In a roll-fed lithographic or letterpress printing process, commonly used inks are dried by solvent removal through adsorption and/or forced evaporation at elevated temperatures in the range of 350° to 400° F. With polymeric materials, however, solvent removal by adsorption does not take place as it does with paper, while forced evaporation is generally not feasible because most polymeric materials undergo thermal and/or dimensional degradation at temperatures of 180 to 220° F. and higher.

It is, therefore, the principal object of the present invention to provide a quicksetting, high scratch and abrasion resistant printing ink composition particularly suited for printing on polymeric materials especially by heretofore little used processes such as lithographic and letterpress printing processes.

It is another object of the present invention to provide a polymeric material the surface of which is printed on with a quickset, high scratch and abrasion resistant printing ink composition.

Broadly, the printing ink of the present invention comprises as essential constituents, dispersed spherulites of high density polyethylene, a colorant and a binder for the polyethylene and the colorant.

More specifically improved, advantageous and unexpected properties are imparted to the printing ink of the present invention by dispersing therein dendritic spherulites of high density polyetheylene having a density of at least 0.950, preferably of at least 0.960, and most preferred in the range of about 0.965 to about 0.970. Density as used herein and in the appended claims is expressed in grams per cubic centimeter measured at 23° C. according to ASTM test D1505-57T.

Dendritic spherulites of high density polyethylene are generally obtained by mixing polyethylene with a liquid which is a solvent for polyethylene at elevated temperatures, generally above 70° C., but is a non-solvent at lower temperatures, heating the mixture until the polyethylene goes into solution, and thereafter cooling the solution to precipitate the polyethylene and form the dendritic spherulites. Dendritic spherulites formed in this manner and having an average particle size of no more than 50 microns in any dimension are suitable for use in this invention. However, it is preferred that dendritic spherulites be formed having an average particle size of 2 to 4 microns in width and 6 to 10 microns in length. Specific procedures for forming dentritic spherulites in the printing ink of the present invention are given below.

By way of explanation, it is believed that the unique capability of the dendritic spherulites of polyethylene of being able to interlock with one another when the ink is printed unexpectedly accounts for the greatly improved scratch and abrasion resistance of the printing ink of the present invention. Even more surprising, it is believed that the unique ability of the dendritic spherulites of polyethylene to rapidly aggregate and assume an interlocking configuration when the ink is printed quite unexpectedly accounts for the rapid increase in viscosity or quicksetting of the printing ink of the present invention. This unique ability to aggregate and interlock only becomes evident when an ink containing dendritic spherulite is spread into a thin film or, in other words, printed. Quite advantageously the spherulites do not aggregate and interlock in the printing ink prior to and during printing. Consequently, printing inks of the present invention can be formulated by conventional techniques and can be made having the requisite degree of viscosity to function properly in conventional printing processes.

Low density polyethylenes, namely those having a density of less than about 0.950 have an average particle size of 3 to 10 microns and form more or less hexagonal spherulites. Low density polyethylene spherulites do not impart the ability to quickset and high scratch and abrasion resistance to printing inks because low density spherulites do not aggregate or interlock in the same manner as high density dendritic spherulites of polyethylene.

The ability to quickset and high scratch and abrasion resistance are imparted to the printing ink of the present invention by dispersing in a wet or liquid printing ink composition from about 1.0 to about 20 percent, preferably from about 5 to about 10 percent by weight, based on the weight of the wet ink, of high density dendritic spherulites of polyethylene as described herein. A printed surface, for example the surface of a polymeric material such as polyethylene film, printed with dried or set printing ink of the present invention will contain from about 1.5% to about 25 percent by weight, based on the weight of the set ink, of dendritic spherulites of polyethylene. Dispersing more than about 20 percent by weight of the spherulites in a wet ink composition is undesirable because the spherulites have a tendency to aggregate and interlock prior to and during printing thereby rendering an ink too viscous to function properly in a printing process. Obviously, the dendritic spherulites must be dispersed in a wet ink in sufficient amounts to permit the spherulites to aggregate and interlock with one another. This amount has been found to be 1.0 percent by weight of a wet ink.

Suitable high density dendritic spherulites of polyethylene have a molecular weight within a range indicated by a melt viscosity of at least 50 cps. and a melt index of not less than 6, and may be either normally solid low molecular weight polyethylene waxes or normally solid higher molecular weight polyethylene resins. Preferred dendritic spherulites of polyethylene have a molecular weight within a range indicated by a melt viscosity of at least 150 cps. and a melt index of not less than 8. Melt viscosity and melt index are more fully described below. Polyethylene waxes are generally characterized as having a molecular weight in the range of 1000 to 5000 while polyethylene resins have a molecular weight of about 5000 and higher.

Suitable high density polyethylene waxes generally have a melt viscosity in the range of 50 cps. to 115,000 cps. Melt viscosity is measured at 140° C. with a Brookfield Rotational Viscometer. High density polyethylene waxes having a melt viscosity less than about 50 cps. are not useful since they do not readily form dendritic spherulites. Preferred high density polyethylene waxes have a melt viscosity of 150 cps. and higher and more preferably 300 cps. and higher.

Suitable high density polyethylene resins generally have a melt index in the range of 6 to 500 decigrams per minute. Melt index is measured at 190° C. and 44 p.s.i. according to ASTM test D-1238-57T. High density polyethylene resins having a melt index less than 6 are not useful because they tend to render an ink too stiff to work easily and "short," that is an ink tends to lose internal cohesion so that it does not transfer readily on a press. Preferred high density polyethylene resins have a melt index in the range of 8 to 300 decigrams per minute.

Both high density polyethylene waxes and resins have a penetration hardness which is a function of density. Penetration hardness is the distance in millimeters a sharp point penetrates a polyethylene sample under a load of 250 grams for a period of 5 seconds (ASTM–D1321). For example, high density polyethylene having a density of 0.950 to 0.965 generally have a penetration hardness of from 0.15 to 0.25 millimeters, while those having a density of 0.965 to 0.97 generally have a penetration hardness of 0.05 to 0.15 millimeters.

High density polyethylene can conveniently be prepared by any known prior art process. For example, both polyethylene waxes and resins can be produced by contacting ethylene with an activated carbon-supported metal such as nickel or cobalt at temperatures between 0 and 250° C. and a pressure of at least 500 p.s.i. according to the teachings of Peters et al. in U.S. Patents 2,658,095 and 2,692,261. Other processes for preparing high density polyethylene waxes and resins are disclosed in U.S. Patents 2,372,001 to Joyce, 2,692,258 to Roebuck et al., 2,692,259 to Peters, 2,699,457 to Ziegler et al., and 2,825,721 to Hogan et al. The aforementioned patents are incorporated herein by reference.

High density polyethylene waxes can also be conveniently prepared by the pyrolysis or thermal degradation of high density polyethylene resins. Pyrolysis is conveniently carried out in a heated pyrolysis tube at about 450° to 600° C., but can be effected in any known manner.

As stated above, the printing ink of the present invention comprises as essential constituents, dispersed dendritic spherulites of high density polyethylene, a colorant and a binder. Binders for printing inks are conventionally of two types: solvent-soluble binders and drying oil binders. Usually sheet fed presses employ inks whose binders contain only drying oils or drying oil modified resins without solvents but may contain mixtures of drying oils and solvent soluble binders. On the other hand, inks used in rotary presses usually contain binders comprised wholly of solvent-soluble binders but may contain some drying oils in addition.

Suitable solvent-soluble binders include acrylic resins, non-drying phenolic and maleic modified resins, rosin, rosin modified phenolics, calcium resinate, modified crepoylic, esters of phenolic modified rosins, non-drying alkyds, and the like. Suitable solvents for such soluble binders are aliphatic and aromatic petroleum solvents in general. Such solvents include kerosene, aliphatic petroleum solvents boiling between 450° and 550° F. benzene, toluene, mixtures of these, and the like. Solvent-soluble binders are generally used in amounts ranging from about 15 percent to about 70 percent by weight, preferably from about 25 to about 50 percent by weight, based on the weight of the wet ink. Solvents for the soluble binders are generally used in amounts ranging from about 15 percent to about 60 percent by weight, preferably from about 30 percent to about 50 percent by weight, based on the weight of the wet ink.

Suitable drying oil binders include linseed oil, tung oil, chinawood oil, tall oil, alkyd, phenolic and maleic resins which have been modified with any of the aforementioned oils, and the like. Conventionally, catalysts are also used with drying oil binder to expedite their oxidation and crosslinking. Suitable catalysts include the naphthenates, linoleates, resinates, octoates, acetates, borates, oxalates, and the like, of cobalt, manganese, cerium or lead. Drying oil binders are generally used in amounts ranging from about 5 percent to about 60 percent by weight, preferably from about 10 to about 30 percent by weight, and catalysts for the drying oils in amounts ranging from about 0.5 percent to about 6 percent by weight, preferably from about 1 to about 3 percent by weight, both based on the weight of the wet ink.

It is to be noted that the two types of binders discussed above can be used in combination in any proportion desired within the ranges indicated. For this reason, the term "binder" as used in the appended claims means either (1) a solvent-soluble binder dissolved in a solvent, or (2) a drying oil binder, or a mixture of (1) and (2).

Colorants for the printing ink of the present invention are dyes and pigments. Suitable dyes include methylene blue, aniline dyes, alizarine red, auramin naphthol, malachite green and the like. Suitable pigments include carbon black, zinc oxide, titanium dioxide, phthalocyanine blue, phthalocyanine green, benzidine yellow, mansa yellow, naphthol yellow lake, cadmium orange, chrome yellow, Prussian blue, bronze blue, crome green, peacock blue lake, monastral blue, red lack C, para red, toluidine red, barium lake red C, sodium lithol red, barium lithol red, lithol rubine, molybdated scarlet chrome, naphthol yellow lake, ferric oxide, aluminum hydrate, and the like. Colorants are generally used in amounts ranging from about 5 percent to about 25 percent by weight, preferably from about 10 percent to about 15 percent by weight based on the weight of the wet ink.

Other commonly known modifiers can be incorporated into the printing ink of the present invention. Other modifiers are wetting agents for the colorant such as triethanol amine, leveling agents such as lanolin, paraffin waxes, and natural waxes such as cerise wax and carnauba wax. Such modifiers are generally used in amounts ranging from about 0 to about 5 percent by weight, preferably from about 2 to about 3 percent by weight, based on the weight of the wet ink.

As indicated previously, the printing ink of the present invention is prepared in such a manner that a dispersion of dendritic spherulites of high density polyethylene is formed. Preparation of an ink can be accomplished by mixing the solvent with or without a binder dissolved therein and/or the drying oil with a high density polyethylene wax or resin of the character described herein. The mixture is then heated until the polyethylene goes into solution with the solvent and/or drying oil. The hot solution is subsequently quench cooled to a lower temperature, while simultaneously subjecting the solution to a high rate of shear. Suitable apparatus for attaining this end include a high speed stirrer in a water or Dry Ice cooled container, a three-roll mill with water cooled rolls and the like. Cooling the hot solution causes the polyethylene to precipitate and form dendritic spherulites. Quick cooling while simultaneously applying a high rate of shear keeps particle size down in the preferred range of 2 to 4 microns in width and 6 to 10 microns in length. Suitable procedures for forming dendritic spherulites in the ink of this invention are given in the examples.

The other constituents of the printing ink, such as colorants, binder, other modifiers, and the like, can be added and mixed in by conventional means before or after preparing this dispersion of dendritic spherulites.

The final printing ink formulation, of course, will be determined by the viscosity characteristics required by the particular printing process in which the ink is to be used. For example, flexographic inks have low viscosities, e.g., 22–25 seconds measured by a #2 Zahn cup, whereas silk screen inks have high viscosities, e.g., 25,000 cps. measured by a rotational viscometer, and lithographic and letterpress inks have very high viscosities, e.g., 300,000 cps.

The printing ink of the present invention can be used to print on any printable surface, be it porous or non-porous, by any known printing process, such as offset, dry offset, lithographic, letterpress, flexographic, rotogravure and silk screen processes. Because of the ability of the printing ink of the present invention to quickset and because of its high scratch and abrasion resistance, it is most aptly suited for printing on polymeric materials by heretofore little used processes for polymeric materials such as the lithographic, letterpress and dry offset processes. With the printing ink of the present invention, it is now possible to print by sheet-fed lithography and letterpress on polymeric sheets at production rates heretofore attainable only with porous materials such as paper. As will be evident to those skilled in the art, the surfaces of polymeric materials can be pretreated mechanically, chemically, thermally or electrically to promote the adhesion of printing ink thereto.

The following examples are intended to further illustrate the present invention and not to limit the same in any manner. Percentages given are by weight unless otherwise indicated.

*Example 1*

This example demonstrates the high scratch and abrasion resistance imparted to a printing ink by dispersed dendritic spherulites of high density polyethylene. A dispersion containing 25 percent dispersed dendritic spherulites of polyethylene wax having a density of 0.965 and a melt viscosity of 350 cps. measured at 140° C. was prepared by quench cooling a hot solution of the polyethylene and toluene in a water cooled container while simultaneously subjecting the solution to a high rate of shear with a high speed mechanical stirrer. Varying amounts of this dispersion were added to a lithographic ink containing 28.6 percent of 530° F. boiling point aliphatic hydrocarbon solvent, 46.1 percent solvent soluble phenolic modified rosin ester varnish and 25.3 percent carbon black. These inks were then printed by the lithographic process onto 8 mil white, medium density polyethylene sheet containing 15 percent titanium dioxide, the surfaces of which had been pretreated by a high frequency corona discharge to promote adhesion. The printed inks were tested for scratch resistance by drawing a weight-loaded point 0.25 millimeter in diameter inclined at 70° slowly over the printed surface. The amount of weight in grams on the point which first removes enough ink so that the white polyethylene shows is taken as the ink's scratch resistance. A scratch resistance of 70 as determined by this test is considered to be the minimum for commercial use while a scratch resistance of 125 is considered excellent for commercial use. The printed inks were also tested for their ability to withstand marring which is an indication of the abrasion resistance of the ink. This property, which is termed rub resistance, was evaluated by rubbing the back of the thumbnail over the printed surface with firm hand pressure five times in such a way as not to cut the substrate. Ratings were made by noting whether marring or ink removal took place according to the following standards.

Excellent _ Not marred.
Good ____ Slightly marred, no ink removed.
Fair _____ Marred and some ink removed without showing white substrate.
Poor ____ Marred and enough ink removed to show white substrate.

Results are given in the table.

| Percent of dendritic spherulites in— | | Scratch Resistance in grams | Rub Resistance |
|---|---|---|---|
| Wet ink | Dried ink | | |
| 0 | 0 | 9.3 | Poor. |
| 1.2 | 1.8 | 74 | Good. |
| 2.5 | 3.8 | 83.5 | Do. |
| 3.8 | 5.9 | 130 | Excellent. |
| 6.2 | 10.5 | 148 | Good. |

*Examples 2–5*

These examples demonstrate the ability of the printing ink of the present invention to quickset.

In each example, a master batch of pigment, soluble binder, solvent for the binder, and wetting agent was prepared in a Hobart blender. Polyethylene and drying oil were then blended with the master batch and the mixture heated to 130° C. to dissolve the polyethylene. A dispersion of polyethylene spherulites was then formed by quench cooling to 110° C. in a water cooled container while very vigorously stirring. The catalyst for the drying oil was then blended in and the ink was ready for printing. Each ink was then printed on corona discharge treated high density polyethylene sheet using a Harris LVM 120 offset lithographic press. Four sheets from each run were taken at random by pulling each sheet from the press immediately upon delivery. After removal from the press, each printed sheet was covered with a clean sheet and tested for offsetting or transfer of wet ink from the printed sheet to the clean cover sheet as follows. Over the printed surface and on top of the clean sheet were placed various weights having one square inch areas. The weights used were 20, 50, 100, 200 and 500 grams/sq. in. The largest weight that did not produce offsetting was recorded and the average for the four sheets was taken as the weight to offset in grams/sq. in. for each ink. The degree of dryness for each sheet after various drying times was also recorded and the average taken. The rub resistance for each sheet was also obtained as described in Example 1 after drying the printed sheets in an oven for 15 minutes at 80° C. Results are summarized in Table I.

TABLE I

| Example | Control | 2 | 3 | 4 | 5 |
|---|---|---|---|---|---|
| Polyethylene-density 0.965, grams | | 2 | 5 | | |
| Polyethylene-density 0.906, grams | | | | 2 | 5 |
| Aliphatic Petroleum Solvent, boiling point 500° F., grams | 32 | 32 | 32 | 32 | 32 |
| Solvent Soluble phenolic modified rosin ester varnish, grams | 35 | 33 | 30 | 33 | 30 |
| Chinawood drying oil, grams | 15 | 15 | 15 | 15 | 15 |
| Carbon Black Pigment, grams | 15 | 15 | 15 | 15 | 15 |
| Cobalt Octoate (drying oil catalyst), grams | 2 | 2 | 2 | 2 | 2 |
| Triethanol Amine (pigment wetting agent) grams | 1 | 1 | 1 | 1 | 1 |
| Percent Dendritic Spherulites in wet ink | | 2 | 5 | | |
| Percent Hexagonal Spherulites in wet ink | | | | 2 | 5 |
| Weight to Offset, grams | 50 | 110 | 212 | 55 | 57 |
| Drying Time in air, minutes | 52 | 27 | 17 | 47 | 28 |
| Degree of Dryness | (1) | (2) | (3) | (2) | (2) |
| Rub Resistance | (4) | (5) | (5) | (4) | (4) |

[1] Wet.  [2] Smudgy.  [3] Dry to touch.  [4] Poor.  [5] Good.

As can be seen from Table I, the inks of the present invention containing dendritic spherulites of high density polyethylene are vastly superior to the ink of the control and the inks of Examples 4 and 5 containing low density polyethylene. The tendency of the ink to offset is greatly reduced and the drying time reduced by this invention as compared to the inks of Examples 4 and 5 which show hardly any over-all improvement from the control.

*Examples 6–11*

In each of these examples, a master batch of pigment, soluble binder solvent for the binder, and wetting agent was prepared in a Hobart blender. High density polyethylene and drying oil were then blended with the master batch and the mixture heated to 130° C. to dissolve the polyethylene. A dispersion of dendritic spherulites of the high density polyethylene was then formed by quench cooling to 110° C. in a water cooled container while very vigorously stirring. The catalyst for the drying oil was then blended in and the ink was ready for printing. In each example, ink was printed on 8 mil white polyethylene sheet pretreated by high frequency corona discharge. The sheet comprised 85% medium density polyethylene and 15% titanium dioxide. Printing was carried out by the offset lithographic process and the printings so produced were allowed to dry in air for 24 hours. Each sheet, printed with a different ink, was tested for scratch and rub resistance as in Example 1. Results are summarized in the table.

TABLE II

| Example | Control | 6 | 7 | 8 | 9 | 10 | 11 |
| --- | --- | --- | --- | --- | --- | --- | --- |
| Polyethylene-density 0.965, melt viscosity 330-350 cps., grams |  | 5 | 2 | 8.5 |  |  |  |
| Polyethylene-density 0.965, melt viscosity 48 cps., grams |  |  |  |  | 8.8 |  |  |
| Polyethylene-density 0.965, melt viscosity 115,000 cps., grams |  |  |  |  |  | 8 |  |
| Polyethylene-density 0.965, melt index 12.7, grams |  |  |  |  |  |  | 3 |
| Aliphatic petroleum solvent, boiling point 500° F., grams | 32 | 31 | 32 | 24.7 | 21.5 | 32 | 32 |
| Solvent soluble phenolic modified rosin ester varnish, grams | 35 | 31.5 | 33 | 35.3 | 42.1 | 27 | 32 |
| Chinawood drying oil, grams | 15 | 14.5 | 15 | 15 | 12.0 | 15 | 15 |
| Carbon black pigment, grams | 15 | 15 | 15 | 13.5 | 12.6 | 15 | 15 |
| Cobalt Octoate (drying oil catalyst), grams | 2 | 2 | 2 | 2 | 2 | 2 | 2 |
| Triethanol amine (pigment wetting agent), grams | 1 | 1 | 1 | 1 | 1 | 1 | 1 |
| Percent dendritic spherulites in wet ink |  | 5 | 2 | 8.5 | 8.8 | 8 | 3 |
| Percent dendritic spherulites in dry ink |  | 8.5 | 4.4 | 13.3 | 13.6 | 13.5 | 5.1 |
| Scratch resistance, grams |  | 148 | 111 | 160 | 125 | 176 | 129 |
| Rub resistance | (¹) | (²) | (²) | (³) | (²) | (³) | (²) |

¹ Poor.  ² Good.  ³ Excellent

The ink of Example 6 was also printed on rigid polyvinyl chloride and rubber modified polystyrene sheets with similar results. The ink of Example 11 was also used to print on cast coated paper and 8 mil. white polyethylene sheet described herein with a sheet-fed A. B. Dick offset duplicator. Sheets of both paper and polyethylene were fed and stacked at a rate 5,000 impressions per hour without sticking or offsetting.

As can be seen from Table II, the inks of the present invention have excellent scratch and abrasion resistance making them ideally suited for commercial applications.

I claim:

1. A quicksetting, high scratch and abrasion resistant wet printing ink composition comprising a colorant and a binder therefor, and dispersed in the wet ink from about 1 to about 20 percent by weight, based on the weight of the wet ink, of dendritic spherulites of polyethylene having a density of at least 0.950 and a molecular weight indicated by a melt viscosity of at least 50 cps. and a melt index at least 6, said spherulites having an average particle size of less than 50 microns in any dimension.

2. The printing ink of claim 1 wherein said dendritic spherulites have an average particle size of 2 to 4 microns in width and 6 to 10 microns in length.

3. The printing ink of claim 1 wherein said dendritic spherulites of polyethylene have a density of from about 0.965 to about 0.970 and a molecular weight indicated by a melt viscosity of at least 150 cps. and a melt index of at least 8.

4. The printing ink of claim 1 wherein said dendritic spherulites of polyethylene comprise from about 5 to about 10 percent by weight of said wet printing ink composition.

5. A quicksetting, high scratch and abrasion resistance wet printing ink composition comprising from about 0.5 to about 25 percent by weight, based on the weight of the wet ink, of a colorant, from about 15 to about 60 percent by weight, based on the weight of the wet ink, of a binder for said colorant, and dispersed in the wet ink, from about 1 to about 20 percent by weight, based on the weight of the wet ink, of dendritic spherulites of polyethylene having a density of at least 0.950, and a molecular weight indicated by a melt viscosity of at least 50 cps. and a melt index at least 6, said spherulites having an average particle size of less than 50 microns in any dimension.

6. The printing ink of claim 5 wherein said binder is of the solvent soluble type and said composition includes from about 15 to about 50 percent by weight, based on the weight of the wet ink, of a solvent for said soluble binder.

7. The printing ink of claim 5 wherein said binder is of the drying oil type and said composition includes from about 0.5 to about 5 percent by weight, based on the weight of the wet ink, of a catalyst for said drying oil binder.

8. A solid polymeric material printed on with the wet printing ink of claim 1.

9. The article of claim 8 wherein said polymeric material is polyethylene.

10. A solid polymeric material having printed thereon a set printing ink comprising a colorant and a binder therefor and from about 1.5 to about 25 percent, based on the weight of the set ink of dispersed dendritic spherulites of polyethylene having a density of at least 0.950 and a molecular weight indicated by a melt viscosity of at least 50 cps. and a melt index at least 6, said spherulites having an average particle size of less than 50 microns in any dimension.

References Cited

UNITED STATES PATENTS 2,628,172   2/1953   Jennett _____ 260—94.9
3,207,735   9/1965   Wijga _____ 260—94.9

DONALD E. CZAJA, *Primary Examiner.*

LEON J. BERCOVITZ, *Examiner.*

V. HOKE, *Assistant Examiner.*